United States Patent [19]
Holmberg

[11] Patent Number: 4,956,101
[45] Date of Patent: Sep. 11, 1990

[54] LIQUID FILTRATION DEVICE AND METHOD USING WAVE MOTION

[75] Inventor: Glenn Holmberg, Tyringe, Sweden

[73] Assignee: Handelsbolaget Sea-Parator, Halmstad, Sweden

[21] Appl. No.: 430,826

[22] Filed: Nov. 2, 1989

Related U.S. Application Data

[63] Continuation of Ser. No. 274,379, Nov. 21, 1988, abandoned, which is a continuation of Ser. No. 33,118, filed as PCT SE86/00232 on May 20, 1986, published as WO86/06648 on Nov. 20, 1986, abandoned.

[30] Foreign Application Priority Data

May 17, 1985 [SE] Sweden .............................. 8502442

[51] Int. Cl.$^5$ .............................................. B01D 33/00
[52] U.S. Cl. .................................... 210/780; 210/785; 210/791; 210/808; 210/154; 210/158; 210/247; 210/385; 210/396; 209/324; 209/348
[58] Field of Search ............. 210/780, 785, 791, 808, 210/154, 158, 162, 247, 359, 385, 388, 389, 343, 396; 209/324, 348

[56] References Cited

U.S. PATENT DOCUMENTS

| | | | |
|---|---|---|---|
| 830,349 | 9/1906 | Meurer | 210/388 |
| 2,073,353 | 3/1937 | Schaub | 210/389 |
| 2,183,896 | 12/1939 | Rupp et al. | 210/785 |
| 2,329,295 | 9/1943 | Reagan | 210/388 |
| 2,638,226 | 5/1953 | Cowan et al. | 210/389 |
| 4,041,560 | 8/1977 | Jacobsen | 210/388 |
| 4,488,835 | 12/1984 | Eicher | 210/154 |

Primary Examiner—W. Gary Jones
Assistant Examiner—Cynthia L. Nessler
Attorney, Agent, or Firm—Ladas & Parry

[57] ABSTRACT

A method and an apparatus for separating bodies from a liquid in which the liquid is passed through a filter and the bodies to be separated are accumulated on the filter. The filter forms an upper bounding limit of a space therebeneath which is alternately subjected to pressure and vacuum relative to the ambient region above the filter. This is achieved according to one embodiment by producing a reciprocal movement of the filter in the form of an oscillating or pendular movement. The pressurization in the space produces separation of the bodies accumulated on the upper surface of the filter to facilitate their discharge from the filter. The separated bodies can be assisted for discharge by mechanical elements and/or by producing wave motion in the liquid.

26 Claims, 6 Drawing Sheets

LIQUID FILTRATION DEVICE AND METHOD USING WAVE MOTION

This is a continuation on application Ser. No. 274,379 filed Nov. 21, 1988, which is a continuation of application Ser. No. 33,118 filed as PCT SE86/00232 on May 20, 1986, published as WO86/06648 on Nov. 20, 1986, now both abandoned.

FIELD OF THE INVENTION

The present invention relates to a method and an apparatus for separating bodies (matter) from a liquid.

PRIOR ART

The term "body" (matter) in the preceding paragraph is, herein, employed in its very broadest interpretation to disclose "occurrences" (bodies/matter) in the liquid, these being characterized in that they are of a consistency which deviates from that of the liquid. Examples—which should not be considered as restrictive as regards, for example, size—of such bodies are splinters, sawdust, chips, grain, powder, plant parts, fibres, lumps (including gelatinous lumps), depositions, flocs, fish, fish spawn, fry, algae, particles, oil droplets etc. The word body (matter) will also have the above-outlined broad scope of meaning in the following description and in the appended claims.

A number of screening apparatuses are known in this art in which a screen grid is placed in a liquid flow in order to separate pollutants and contaminants in the liquid. Such apparatuses are provided, in certain physical applications, with vertically reciprocating devices which mechanically move the pollutants deposited on the grid upwards and out of the liquid and to a receptacle. However, such apparatuses suffer from the drawback that they are relatively tall and require mechanically stable frames in order not to jeopardize operational safety and reliability. Moreover, the filters employed in such apparatuses become readily blocked, thus often necessitating regular cleaning. Even if certain filter constructions are provided with mechanical cleaning devices which start automatically, for example at certain time intervals, it is, as a rule, necessary to supplement this mechanical cleaning with a manual cleaning operation. Apparatuses of the type mentioned in this paragraph entail high capital investment costs and, in many physical applications, also high running costs.

U.S. Pat. No. 2,638,226 discloses an apparatus provided with a screening mesh which is placed in a liquid flow and is journaled such that, by rotational imbalance, it may be caused to vibrate. This apparatus is primarily intended for use as a separator which, in papermaking, separates coarser particles and allows smaller particles to pass, for example to allow water and paper fibres to pass, while separating splinters, sawdust and projections (column 4, lines 38–40). In certain applications, the apertures of the screen mesh are reduced in size in order also to separate the fibres (column 5, lines 1–11). The fibre mat which is thereby formed migrates, because of the vibrations, along the upper surface of the screen mesh and leaves the apparatus at its upper end (the discharge end). Since large areas of the screen surface remain covered by pollutants during the screening operation, a screen according to the described embodiment suffers from reduced flow capacity which results in requirements of larger screen surface operative areas with consequentially increased costs.

A further screening apparatus is also known in this art, comprising one fixed and one moving grid formed of rods which are placed obliquely in relation to the direction of flow of the water. The rods are provided with shoulders, whereby the shoulders of the moving grid shift the gathered pollutants upwardly along the fixed rods at the same time as the moving grid executes a substantially circular movement in order to collect and deposit matter gathered against the screen. Also in this construction, large areas of the screen surface remain covered by the separated material and, as a consequence, the through-flow area of the apparatus is reduced. In order to attain the desired capacity, relatively large installations of this type are required, with consequentially elevated costs.

SUMMARY OF THE INVENTION

The present invention provides a technique in which in large water flow volumes, substantially the entire screen surface is cleaned of collected bodies (matter) during, as a rule, relatively short time intervals and in which the released bodies (matter) are substantially immediately thereafter moved directly towards that region of the screen surface which is located in association with the surface of the liquid.

The nature of the present invention and its aspects will be more readily understood from the following brief description of the accompanying drawings, and discussion relating thereto.

BRIEF DESCRIPTION OF THE FIGURES OF THE DRAWINGS

In the accompanying drawings

DETAILED DESCRIPTION OF PREFERRED EMBODIMENTS

Referring to the drawings, FIGS. 1-4 illustrate embodiments of the present invention in which a filter 11 is placed in an apparatus 22, for example a channel, or a bath, through which liquid 10 passes from an inflow end 37 of the apparatus and to an outflow end 38. In the continuance of this disclosure, the designation, bath 22, will generally be used, without restrictive import, for this apparatus. The designations inflow end and outflow end, respectively, are also to be considered as blanket terms and, herein, relate to regions upstream of the filter, and regions downstream of the filter, respectively. The liquid which is supplied at the inflow end 37 contains bodies (matter) 16 to be removed from the liquid, while the liquid in the region of the outflow end 38 is substantially free of such bodies.

In the embodiments of the present invention illustrated in FIGS. 1–3a, the liquid passes into the bath 22 through the intermediary of one or more inflows 23. In the figures, the bottom 32 and side walls 33a,b of the bath are specifically disclosed. In the figures, there are also illustrated one or more outlets 24 disposed in association with the outflow end 38 of the bath.

In the figures, the filter 11 is illustrated as being pivotally journaled about a shaft 20. In certain embodiments, use is made of a shaft 20 which is fixedly anchored at the frame 41 of the filter 11 and, in its turn, rests in journals 40. In other embodiments, the filter is movably journaled in relation to the shaft 20. Drive means (not shown) are provided for reciprocally pivoting the filter within adjustable extreme limits. In certain embodiments, the pivotal action is effected by means of the shaft 20, while in others, such action is effected by drive means which act directly on the filter and rotate the filter about the shaft 20, or alternatively about the journals of the shaft. The drive means, which may be of, for example, hydraulic or electric type, are, furthermore, adjustable for different fixed or varying pivotal speeds. In certain embodiments, the drive means are provided for intermittent pivotal motion of the filter. The terms upstream and downstream refer to the flow direction 17 (the major flow direction) along which the liquid travels in its passage through the bath.

The frame 41 of the filter consists of a transverse frame section 50 located upstream and a transverse frame section 51 located downstream, and longitudinal frame sections 52a,b which interconnect the transverse frame sections.

In the illustrated embodiments, a filter member 42, for example a filter cloth, a screen grid, a mesh, spaced rods relationship, etc. or combinations hereof, is disposed in the frame 41 of the filter. The screen apertures and/or mesh gauge of the filter members are adapted to the size of the bodies which are to be separated from the liquid. The filter member 42 has an upper bounding surface 13 and a lower bounding surface 14 which are located upstream and downstream of the filter, respectively.

Furthermore, the filter is, as a rule, disposed in an inclined plane such that the filter most proximal the inflow (upstream) is at a lower position (the lower portion 12 of the filter), and most proximal the outflow (downstream) is at a higher position (the upper portion 43 of the filter). The reference numeral 15 designates the discharge section of the filter. The filter constitutes an upper bounding definition of a space 35. The reference numeral 48 designates that portion of space 35 which is substantially only filled with air, or possibly also to a certain degree with liquid or liquid droplets on their way towards the liquid collected in the bath.

FIGS. 1-3a illustrate embodiments of the present invention in which the lower portion 12 of the filter, during the entire movement pattern of the filter, is located at least partially in the liquid and the upper portion 43 of the filter is located above the level of the liquid.

Figure 3A:
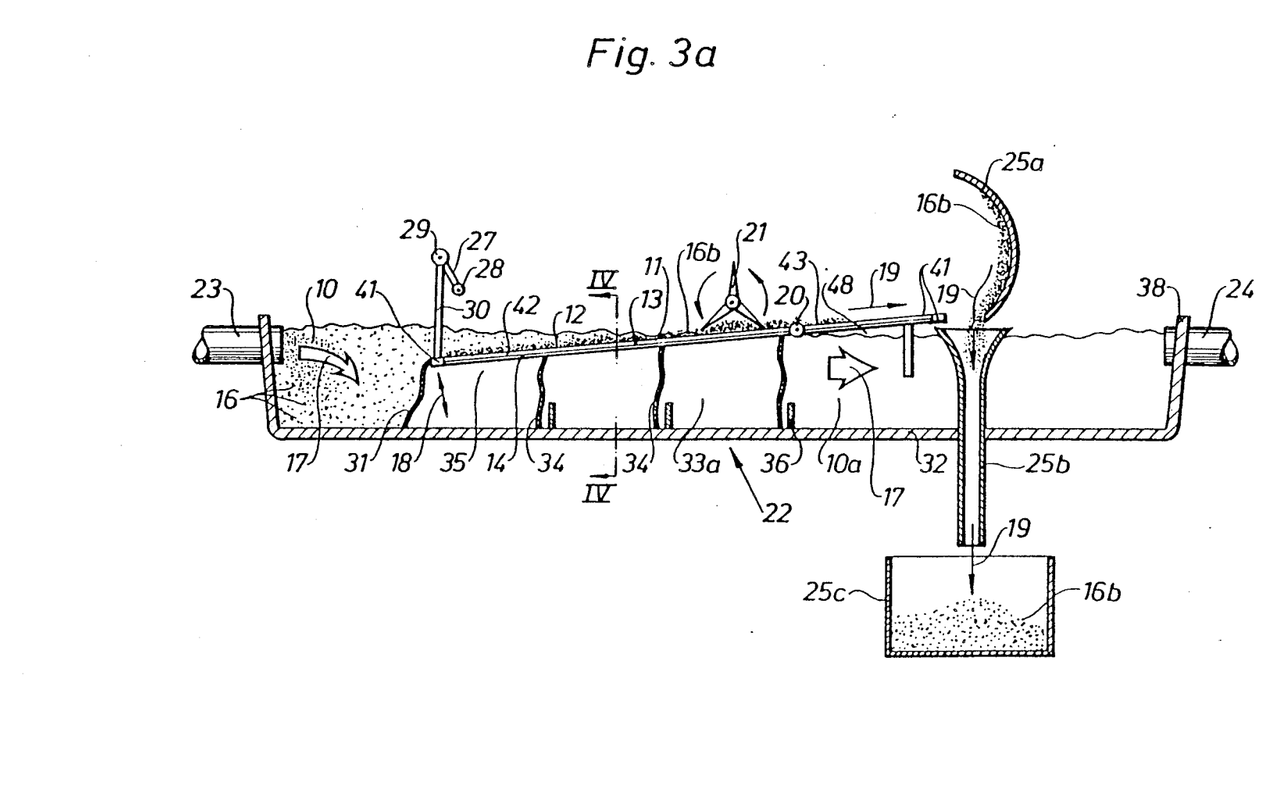
FIGS. 3a,3b are longitudinal sections through alternative embodiments of the filter apparatus according to the present invention.
Figure 3B:
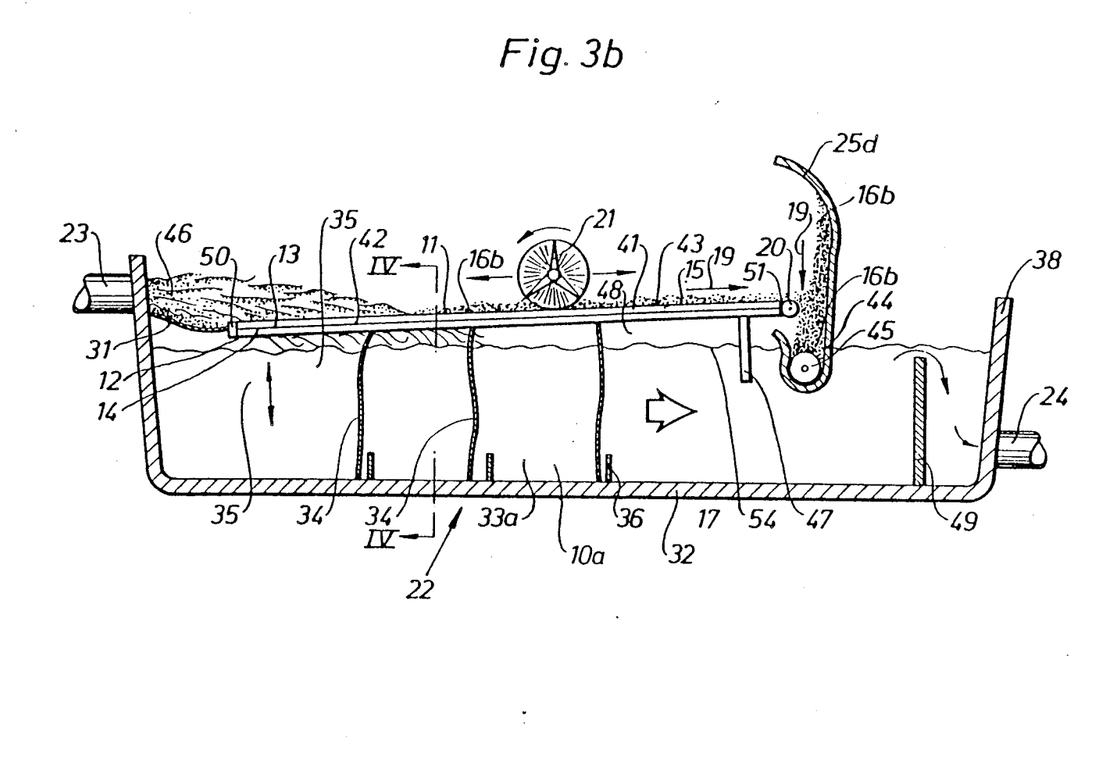

FIG. 3b illustrates an embodiment of the present invention in which the portion of the filter located most proximal the inflow is located, at least in its uppermost position, above the level of the liquid, i.e. the mean liquid surface level 54, in the region adjacent to that part of the filter located most proximal to the outflow. The shaft 20, about which the filter pivotally reciprocates, is, as a rule, disposed in immediate conjunction with the downstream transverse frame section 51 of the filter.

In certain embodiments, there is provided, between the frame 41 of the filter and the bath, a bellow device 31 (FIGS. 2a,3a and 4) which substantially sealingly connects at least that part of the frame which is surrounded by liquid, to the defining surface of the bath, for example to the walls 33a,b of the bath and the bottom 32 of the bath. In order that it be possible for liquid to be displaced from the inflow portion to the outflow portion, the liquid must, thus, pass through the filter member 42 of the filter.

Figure 1:
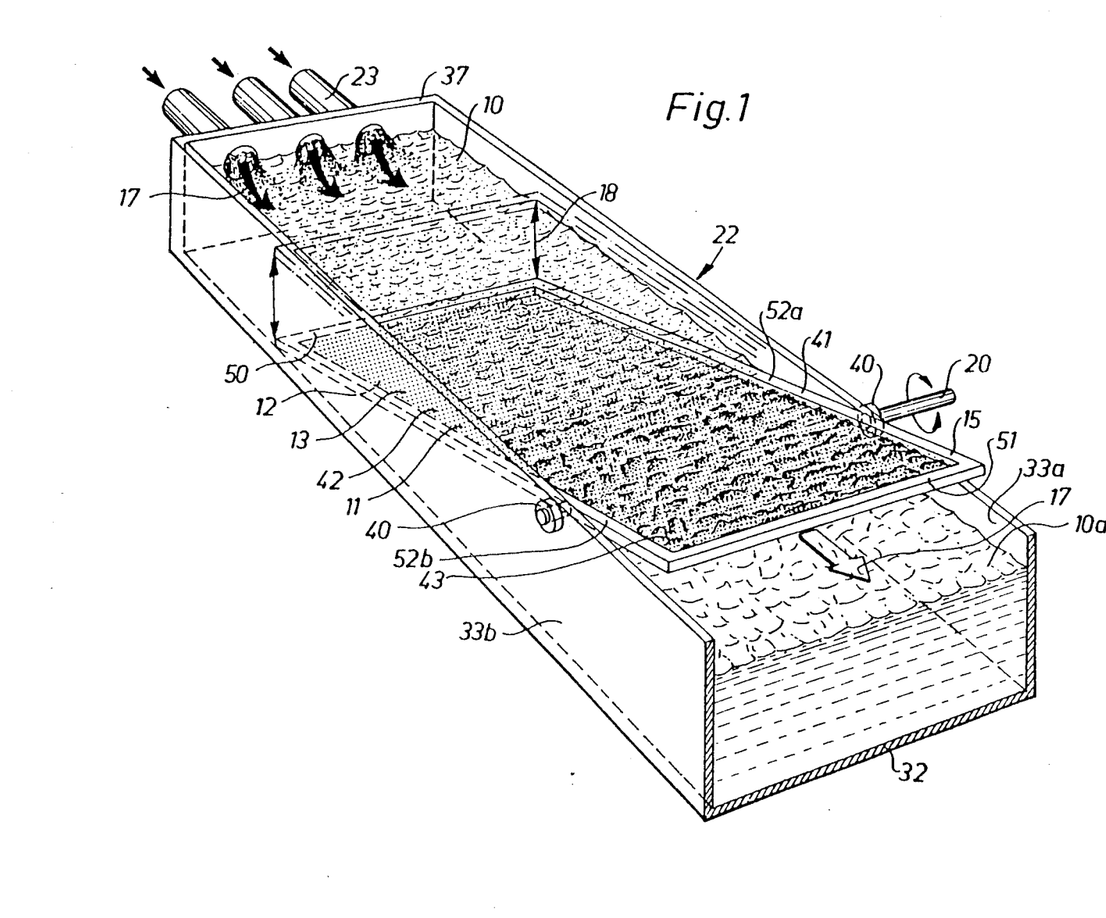
FIG. 1 is a perspective view of a fundamental apparatus according to the present invention.
Figure 2A:
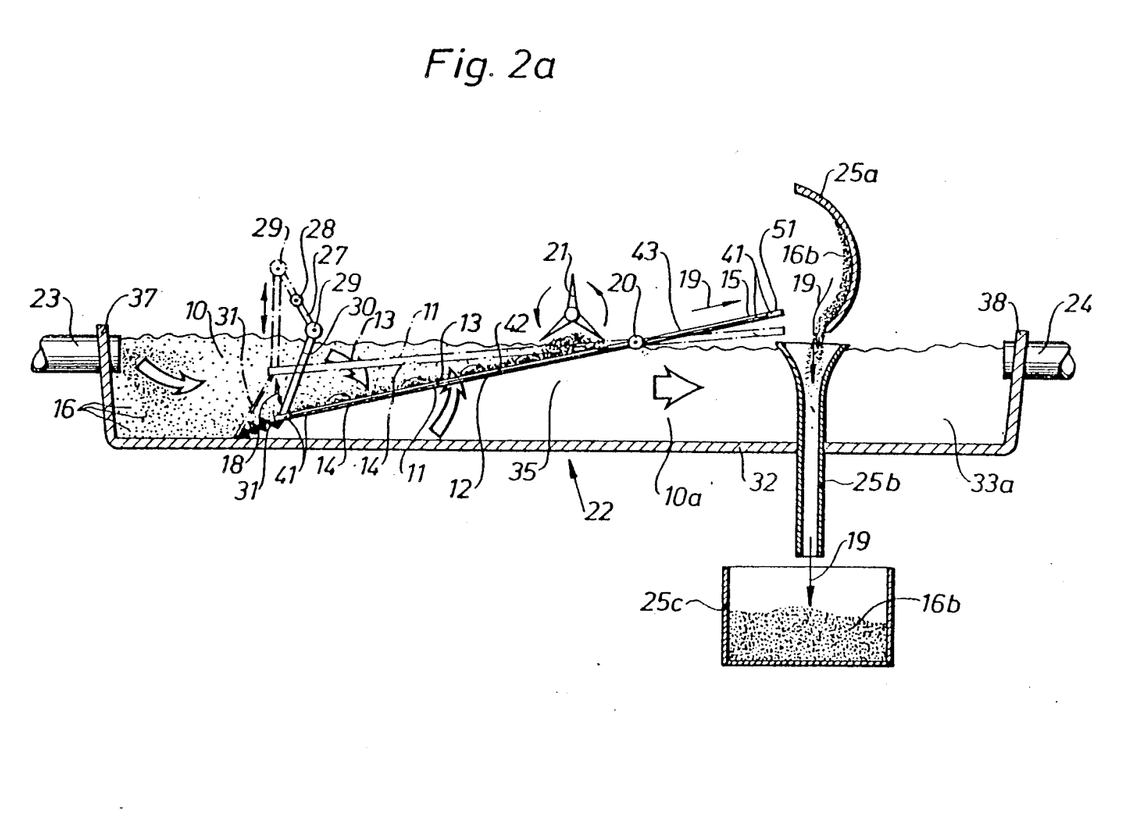
FIGS. 2a,2b are longitudinal sections through a filter apparatus placed in a bath through which a liquid flows.
Figure 2B:
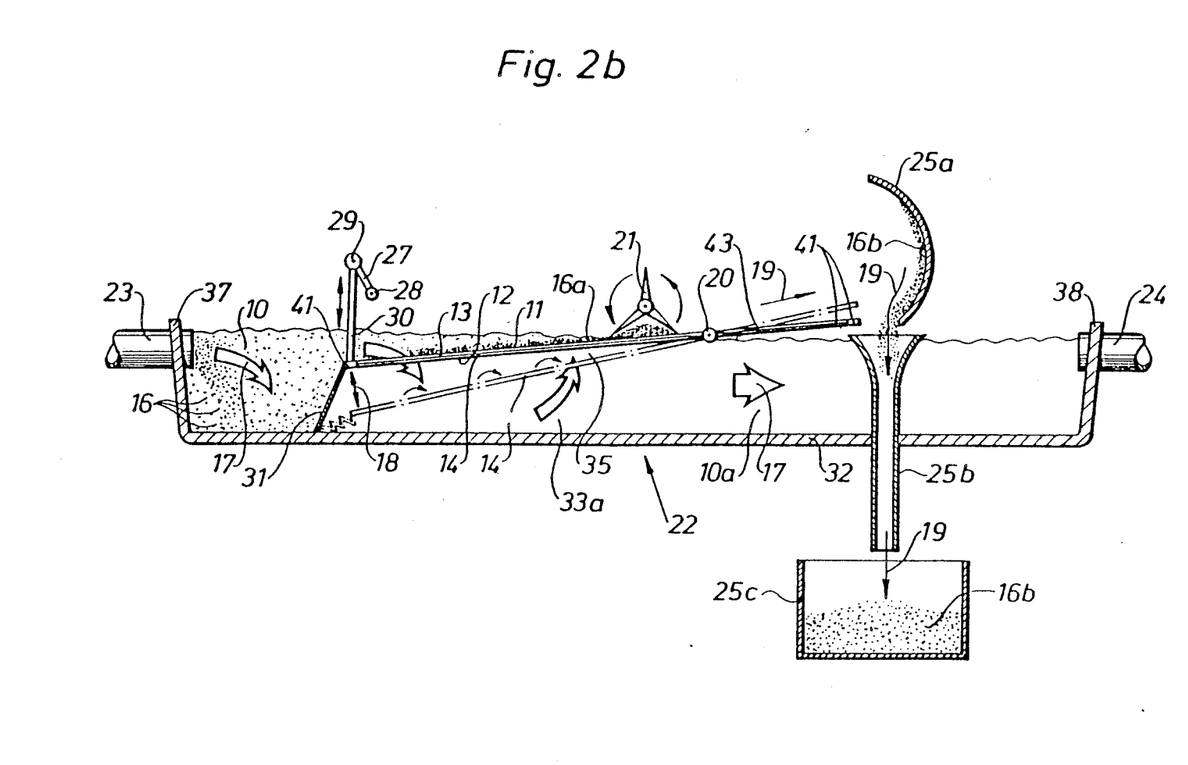
Figure 3C:
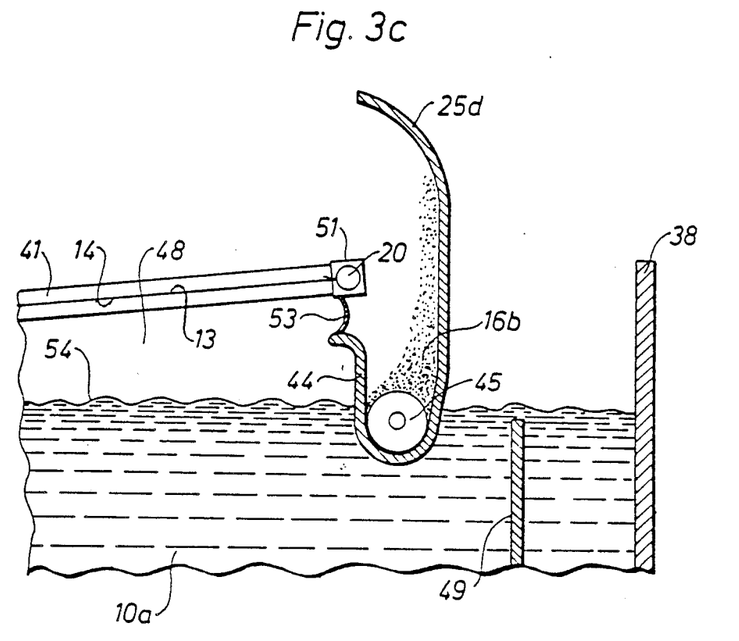
FIG. 3c is a partial section through an alternative embodiment of the discharge section of the filter apparatus.

As has been previously pointed out, the lower portion 12 of the filter is, as a rule, disposed to describe a reciprocal movement which is shown, in the figures, as a substantially upward and downward movement in that the filter pivots reciprocally—or in pendular motion—about the shaft 20. In one preferred embodiment of the present invention, the angular amplitude of this pendular motion is of the order of magnitude of at most approx. 20° and the mean inclination of the filter in relation to the horizontal plane is at most approx. 30°. In FIGS. 2a, 2b and 3a, there are shown embodiments of the invention in which a brush 21 is provided for producing a supplementary displacement of bodies 16a gathered during the separation process to a receptacle device 25a-d. In FIGS. 2a-2b and 3a, this receptacle device is composed of a receptacle shield 25a and a receptacle conduit 25b which discharges into a container 25c. An arrow 19 designates the displacement of the particles 16b in the receptacle device. FIGS. 3b and 3c illustrate an embodiment in which the receptacle device 25d consists of a U-shaped channel 44 which merges into a receptacle shield. The channel is provided with a conveyor screw 45 for displacement of the bodies to a receptacle vessel (not shown). In the Figures, the brush 21 describes a rotational movement and further includes means (not shown) movable in a direction towards and away from the receptacle device, the brush, on movement from the receptacle device, being located above the upper bounding surface 13 of the filter member 42. In certain physical applications, the brush is substituted by a scraper, or doctor blade.

In FIGS. 2a, 2b and 3a, there is shown one embodiment of drive means for the pendular motion of the filter. In this instance, the drive means are connected to a rotary shaft 28 which is connected, through the intermediary of a crank lever 27 and a crank shaft 29, to a drive arm 30 which is connected to the filter 11. On rotation of the drive shaft 28, the drive arm 30—and thereby the lower portion 12 of the filter —will describe a substantially upward and downward movement which, in the Figures, is designated by the double-headed arrow 18. It will be obvious to the skilled reader of this specification that the pendular motion of the filter may be achieved in a multiplicity of different ways without departing from the spirit and scope of the present invention, for example, by one or more hydraulic devices which are directly connected to the frame of the filter.

Figure 4:
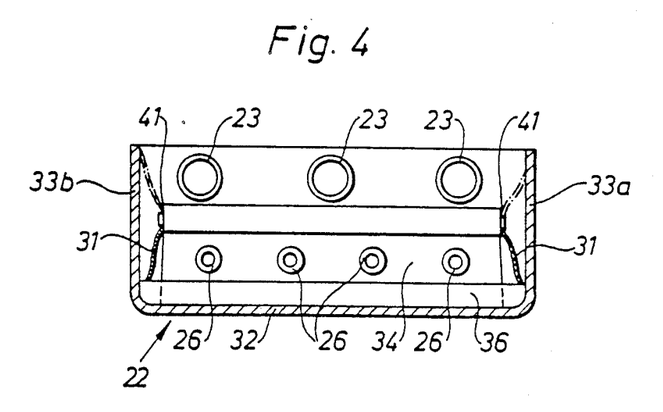
FIG. 4 is a section taken along the line IV—IV in FIGS. 3a or 3b.

The embodiment shown in FIGS. 3a, 3b and 4 illustrates how one or more defining walls 34, 36 are provided between the filter 11 and the bottom 32 of the bath in order to impede the liquid from being displaced towards the outflow end of the bath when the filter 11 moves downwardly towards the bottom of the bath. In these Figures, the defining walls form bulkheads 36 upstanding from the bottom of the container or bath, and slightly resiliently yieldable wall portions 34 depending from the filter. The purpose of the bulkheads 36 is, here, to stabilize the positions of the depending wall portions in the horizontal direction. The depending wall portions are, moreover, provided with apertures 26 of a size which is adapted for the requisite retardation of the movement of the liquid towards the outflow portion of the bath in each contemplated field of application.

FIG. 3b shows an embodiment in which the filter 11 is of substantially planar orientation and in which the filter is, with its portion 12 most proximal the inflow, located above the liquid surface level at least when that portion is in its uppermost position. The liquid is supplied in the form of one or more liquid jets 46 which are directed substantially in the plane of the filter and which impinge upon the upper bounding surface 13 of the filter. In one preferred embodiment, the liquid is supplied in the form of a jet column 46, the column being disposed in the transverse direction of the bath and being substantially horizontal.

In conjunction with the discharge portion 15 of the filter, the filter is, in the embodiment illustrated in FIG. 3b, provided on its underside with a substantially vertical wall 47 of a length which entails that the wall always reaches down into the liquid 10a which has passed through the filter. The wall connects substantially sealingly with the side walls 33a,b of the bath, whereby the filter and the vertical wall 47 define the space 48 located beneath the filter and containing air—and to a certain degree also liquid—which has just passed the filter member 42. FIG. 3b also shows an embodiment in which a spillway overflow 49 regulates the level of liquid in the bath.

FIG. 3c illustrates in detail an alternative embodiment in which the wall 47 has been substituted by a sealing connection 53 between the filter 41 and the U-shaped channel 44 of the receptacle device. In this figure, this connection consists of a flexible diaphragm, for example a rubber sheet. However, it will be obvious to those skilled in this art that this substantially sealing connection may, without departing from the inventive concept as herein disclosed, also be formed, for example, by direct abutment between the filter and the U-shaped channel, the abutment surfaces being here adapted so as to permit, with fully retained sealing function, the movement of the filter in relation to the channel. The channel is, furthermore, located so as to entail that the channel, throughout its entire length, reaches down into the liquid 10a.

When the filter describes an upward and downward movement in the liquid, there will be obtained a passage of liquid from one side of the filter to the opposite side, and, in the embodiment illustrated in FIGS. 3b and 3c, a pressure change in the space 48 above the surface 54 of the liquid, respectively. Each time liquid flows through the filter in a direction towards the outflow section of the bath, the bodies are gathered against the filter and, in this instance, also reduce the total open through-flow area of the filter and thereby, to a certain degree, throttle the flow through the filter. When the filter switches to a downwardly directed movement, the bodies gathered against the filter member 42 are released by the liquid flow which runs from the underface 14 of the filter towards the upper face 13 of the filter and/or by the pressure increase in the space 48. However, as a rule the above-mentioned liquid flow is reduced to a minimum, and, in certain physical applications, the filter is disposed so as, at least during parts of the downwardly directed movement, to avoid allowing liquid to pass through the filter. The bodies are moved in a direction towards the discharge portion 15 of the filter, either by a liquid flow in the major flow direction 17 or by the mechanical displacement device 21 which serves for the displacement at least in that part of the filter where the liquid never reaches.

On movement of the filter counter to the major flow direction, that region which had received the bodies is moved up out of the liquid and is made available to the displacement device 21 by means of which the bodies 16b are further displaced to the receptacle device. As a rule, the speed of movement and mesh gauge of the filter are adapted to the viscosity of the liquid and the size of the bodies, so that, on downward movement of the filter in relation to the liquid, excess pressure arises in the filter surface 14 located downstream of the major flow direction, i.e. the lower bounding surface of the filter. Such is the case irrespective of whether the space 35 adjacent to the lower surface 14 includes the space 48 or not. As a result of the excess pressure, the uninterrupted laminate liquid flow is led in over the upper surface 13 of the filter and entrains therewith those bodies which had, on downwardly directed movement of the filter, been raised and/or released from the upper filter surface. Through the previously-disclosed selection of speed of movement, mesh gauge etc. it is possible, on each individual cycle of movement of the filter, to displace the greater part of the bodies gathered on the upper surface of the filter to that region of the filter which, during the major portion of the movement of the filter, is not passed by liquid. As a result, during each cycle, the apertures of the filter will be cleaned, and, at the same time, the situation will be avoided that the bodies once again block at least those mesh openings or apertures which are passed by the liquid during the greater part of the movement of the filter.

In certain applications, the speed of movement, mesh gauge etc. of the filter are selected such that the liquid flow over the upper surface of the filter generates a wave motion which assists in displacing the bodies towards the receptacle device of the filter in that the wave leaves behind bodies on that region of the filter which, during the greater part of the movement of the filter, is located above the wash of the liquid.

In the embodiments according to the present invention illustrated in FIGS. 3a, 3b and 4, the through flow of the liquid—and where applicable, the wave formation—is amplified in that the defining walls 34, 36 partly hinder the liquid from passing towards the outflow end of the bath in conjunction with the downwardly-directed movement of the filter. The defining walls also provide the possibility, with the assistance of the space 35, of adaptably governing the through-flow area and thereby the liquid flow in a direction towards the outflow end of the bath in conjunction with the downwardly directed movement of the filter.

In the embodiments illustrated in FIGS. 3b, 3c, the mesh gauge and the speed of movement of the filter are adapted to the size of the space 48 beneath the filter in order that the pressure increase which arises in the space is able to raise and/or release those bodies which have gathered on the upper surface of the filter. On movement of the brush in a direction towards the upper portion of the filter, the raised and/or released bodies accompany the brush and are displaced to the U-shaped channel 44. Efforts should generally be made to ensure that the pressure increase merely produces a minor raising of the bodies, in that the pressure increase is adapted such that liquid located in the mesh of the filter is retained in the mesh and forms an upwardly directed bubble. However, in certain applications, it has proved appropriate to make the pressure increase of such a magnitude that a gas passage is effected through the mesh of the filter.

In yet a further embodiment according to the present invention, the filter 42 has a substantially fixed position in the bath and there assumes a location corresponding to that shown in FIG. 3b, i.e. the entire filter is positioned above the level of the liquid surface 54. Pressure and evacuation means (not shown), for example of bellows-like arrangement, are connected to the substantially closed space 48 located beneath the filter. By governing these means in order alternatingly to create excess pressure and partial vacuum, respectively, in the space 48, an effect will be attained corresponding to that discussed in conjunction with the movement of the filter in those embodiments described with reference to FIGS. 3b and 3c. The employment of excess pressure, and possibly also of partial vacuum in a space located in conjunction with the underface of the filter and bounded by the filter is also applicable to stationary filters which have a relatively great inclination and which, at their upper portion, are supplied with the liquid and body (matter) mixture. In the event of excess pressure in the space, bodies gathered on the upper face of the filter are released in a manner corresponding to that described above and this will thereby prevent the mesh and/or apertures of the filter from being blocked.

It is also obvious to a person skilled in the art that the filter member 42 may, in certain fields of physical application, be formed of rods or bars disposed adjacent to one another. In such an instance, the spacing between the rods is adapted to the speed of movement of the filter, the viscosity of the liquid and/or the size of the space 48 in order to attain the above-described functions and effect.

It will be clearly apparent from the foregoing description that there will be obtained, by the employment of the present invention, a self-cleaning filter irrespective of whether the filter has a portion which is always located beneath the liquid level 54 or whether it is wholly and completely located above the liquid level. As a result, the filter will be of extremely high operational reliability, will have a high throughput capacity and, moreover, will be extremely compact and simple in its construction. Field trials have proved in practice that this technique is applicable within very broad limits for the size of the mesh and/or apertures of the filter. Thus, it has been experimentally demonstrated that the filter has an extremely good separation capacity in the use of filter cloths whose mesh gauge is of the order of magnitude of down to approx. 1 um. Hence, it has in practice even been possible to separate microalgae from seawater.

While, in the above-described embodiments of the present invention, the filter has been shown in applications where the filter describes a pendular motion, it will be obvious to those skilled in this art that the above-described filter action may be obtained in embodiments in which the filter member 42 is disposed for a substantially uniform reciprocal movement, for example a substantially upward and downward movement, with essentially fully retained orientation of the filter member, or is disposed for a uniform rotational movement in the vertical plane.

The invention has been described in the foregoing in association with a bath or channel, but it will be further obvious to those skilled in this art that a corresponding filter effect may also be achieved for certain of the embodiments as herein disclosed for water in, for example, lakes, if the filter is, for instance, mounted on the bow of a boat and the boat is propelled across the surface of the water at the same time as the filter describes an upward and downward movement in accordance with the above description. Hence, the invention provides the possibility of separating a wide variety of bodies from the water, and practical experiments have demonstrated that the filter is also suitable for directly collecting and taking up oil spill from seawater.

The foregoing detailed description has referred to but a limited number of embodiments of the present invention, and it will be readily perceived by the skilled reader of this specification that many modifications and embodiments of the present invention are conceivable without departing from the spirit and scope of the appended claims.

What is claimed is:

1. A method of separating bodies from a liquid comprising flowing a jet of liquid containing bodies to be separated therefrom onto a filter member through which the liquid passes and travels for discharge as a liquid body beneath the filter member, said filter member being positioned for forming a space therebeneath with the level of the liquid body and through which space the liquid can flow for discharge, the bodies to be separated from the liquid being accumulated on the top surface of the filter member effecting substantially reciprocal movement of said filter member relative to said liquid body for alternately producing pressure and vacuum forces in said space relative to the ambient pressure above the filter member, said filter member penetrating into the liquid body during the reciprocal movement of said filter member, the pressure forces acting to raise the accumulated bodies on the surface of the filter from said surface, and producing a wave motion in said liquid body when the filter member penetrates into the liquid body to displace the bodies raised above the surface of the filter member for discharge therefrom.

2. A method as claimed in claim 1 wherein said reciprocal movement is an upwards and downwards movement relative to the surface of the liquid body.

3. A method as claimed in claim 1 wherein said reciprocal movement is a pendular movement relative to the surface of the liquid body.

4. A method as claimed in claim 1 wherein said filter member is reciprocally moved between raised and lowered positions relative to the surface of said liquid body, said filter member in said raised position being entirely disposed above the liquid body.

5. A method as claimed in claim 1 wherein the space between the filter member and the surface of the liquid body is filled with a gas which undergoes compression when the filter member moves towards the liquid body during said reciprocal movement.

6. A method as claimed in claim 5 wherein said gas is air.

7. A method as claimed in claim 1 wherein said jet of liquid is introduced onto the filter member substantially in the plane thereof.

8. A method as claimed in claim 1 wherein the bodies on the filter surface are further displaced for discharge by mechanically pushing the bodies to a discharge region of the filter member.

9. A method as claimed in claim 1 wherein said pressure and vacuum forces are produced by alternatively pressurizing and venting said space with a pressure medium.

10. A method as claimed in claim 1 wherein said filter member has a discharge end, said separated bodies being displaced to said discharge end from which the separated bodies fall by gravity, the method further comprising collecting the falling bodies and externally discharging the same.

11. A method as claimed in claim 1 wherein said filter member moves upwardly and downwardly during said reciprocal movement, the filter member having an upstream end at which the liquid is supplied thereto and a downstream end; said downstream and remaining above the liquid body during said reciprocal movement.

12. A method as claimed in claim 11 wherein said upstream end penetrates into the liquid body during the reciprocal movement.

13. Apparatus for separating solids from a liquid comprising a filter member having upper and lower surfaces, means for conveying a jet of liquid containing solids to be separated therefrom onto the upper surface of the filter member, channel means beneath said filter member into which the liquid, freed of the solids by the filter member, can pass and travel for discharge as a liquid body, support means movably supporting said filter member in said channel means to form a space with the liquid body therein which can be increased and decreased, drive means for producing reciprocal movement of said filter member relative to said channel means such that said space is alternately subject to pressure and vacuum relative to ambient pressure when the filter member is reciprocally moved to decrease and increase said space respectively, the increased pressure providing means for raising the solids from the surface of the filter, said drive means including means for moving a portion of the filter member downwardly into the liquid body during reciprocal movement of the filter member to a position below the level of the liquid in the channel means under conditions to produce a wave providing means for conveying the raised solids for discharge from the filter.

14. Apparatus as claimed in claim 13 wherein said support means comprises journal means pivotably supporting said filter member for movement about a pivot axis extending transversely of the direction of travel of said jet of liquid.

15. Apparatus as claimed in claim 14 wherein said pivot axis is substantially horizontal and said filter member describes a pendular motion.

16. Apparatus as claimed in claim 14 wherein said filter member has an inlet portion at which the jet of liquid is conveyed thereon and a discharge portion from which the solids are discharged, said journal means being operatively associated with said discharge portion.

17. Apparatus as claimed in claim 14 wherein said journal means supports the filter member so that it describes a uniform upward and downward movement with substantially retained orientation.

18. Apparatus as claimed in claim 14 wherein said apparatus further comprises means sealingly connecting said filter member to said channel means, and means enclosing said space between the lower surface of the filter member and the upper surface of the liquid body in said channel means.

19. Apparatus as claimed in claim 14, said apparatus further comprising means connecting said portion of the filter member which is submerged in the liquid body to said channel means in liquid sealing relation.

20. Apparatus as claimed in claim 14 wherein said channel means includes a bottom and spaced side walls upstanding from said bottom.

21. Apparatus as claimed in claim 14 comprising means for producing pressure and vacuum forces in said space to supplement the pressures and vacuum forces produced by the driven filter member.

22. Apparatus as claimed in claim 16 wherein said means for conveying the jet of liquid is so positioned that said jet of liquid is conveyed substantially in the plane of the filter member.

23. A method of separating bodies from a liquid comprising supplying liquid containing bodies to be separated therefrom into a channel member, reciprocally moving a filter member relative to the channel member such that liquid travels through the filter member in opposite directions, separating bodies from the liquid on the upper surface of the filter member during reciprocal movement of the filter member while the liquid travels in a main direction of flow through the filter member, separating the accumulated bodies from the upper surface of the filter member while the filter member moves in said main direction of flow of the liquid, and displacing said bodies, when separated from said filter member, towards a discharge end of the filter member, said filter member moving downwardly when the bodies are separated from the upper surface of the filter member and the liquid flowing upwardly through the filter member to assist in the separation of the bodies from the upper surface of the filter member, said liquid which flows upwardly through the filter member being at a lower level than the remainder of the liquid in the channel member whereby a wave is formed which acts to displace the separated bodies towards said discharge end.

24. Apparatus for separating bodies from a liquid comprising a channel member having an inlet end and a discharge end, means for supplying liquid, containing bodies to be separated therefrom, at said inlet end of said channel member, a filter member in said channel member, said filter member having an upstream end facing said inlet end of the channel member and a downstream end facing said discharge end of the channel member, said filter member further having upper and lower surfaces, means in said channel member for causing the supplied liquid to travel through the filter member so that bodies in the liquid are retained and accumulate on the upper surface of the filter member, means for discharging liquid from which the bodies have been separated at the discharge end of the channel member, means for reciprocably moving said filter member relative to said channel member in upwardly and downwardly directions, said filter member being immersed in said liquid in the channel when the filter member moves in the downward direction providing means for producing a wave and displacing the separated bodies by said wave towards said downstream end of the filter member whereat accumulated bodies are discharged from said filter member.

25. Apparatus as claimed in claim 24 wherein said filter member has an upper position during reciprocal movement in which the filter member is located in entirety above the liquid in the channel member.

26. Apparatus as claimed in claim 25 wherein said means for reciprocably moving said filter member comprises a journal pivotably supporting the filter member for movement about a horizontal axis and drive means for pivotably moving said filter member around said journal in a pendular movement.

* * * * *